United States Patent
Kim et al.

(10) Patent No.: US 10,886,532 B2
(45) Date of Patent: Jan. 5, 2021

(54) NANOROD-SHAPED CATHODE ACTIVE MATERIAL FOR LITHIUM SECONDARY BATTERY, MANUFACTURING METHOD THEREOF, AND LITHIUM SECONDARY BATTERY INCLUDING THE SAME

(71) Applicant: KOREA BASIC SCIENCE INSTITUTE

(72) Inventors: Jong Guk Kim, Daejeon (KR); Hae Jin Kim, Daejeon (KR); Won Gi Hong, Daejeon (KR); Jin Bae Lee, Daejeon (KR)

(73) Assignee: KOREA BASIC SCIENCE INSTITUTE, Daejeon (KR)

( * ) Notice: Subject to any disclaimer, the term of this patent is extended or adjusted under 35 U.S.C. 154(b) by 92 days.

(21) Appl. No.: 16/182,738

(22) Filed: Nov. 7, 2018

(65) Prior Publication Data
US 2019/0140272 A1     May 9, 2019

(30) Foreign Application Priority Data
Nov. 8, 2017    (KR) ........................ 10-2017-0147929

(51) Int. Cl.
| | |
|---|---|
| H01M 4/505 | (2010.01) |
| H01M 10/0525 | (2010.01) |
| H01M 4/525 | (2010.01) |
| C01G 53/00 | (2006.01) |
| C01G 51/00 | (2006.01) |
| H01M 4/02 | (2006.01) |

(52) U.S. Cl.
CPC ............ *H01M 4/505* (2013.01); *C01G 51/50* (2013.01); *C01G 53/50* (2013.01); *H01M 4/525* (2013.01); *H01M 10/0525* (2013.01); *C01P 2002/72* (2013.01); *C01P 2004/03* (2013.01); *C01P 2004/16* (2013.01); *C01P 2004/54* (2013.01); *H01M 2004/028* (2013.01)

(58) Field of Classification Search
None
See application file for complete search history.

(56) References Cited

FOREIGN PATENT DOCUMENTS

| | | | |
|---|---|---|---|
| CN | 103296270 A | * | 9/2013 |
| KR | 1020100107788 | | 12/2011 |

OTHER PUBLICATIONS

Trends of development of cathode active material for a lithium secondary battery in Ceramist vol. 13, No. 5, Oct. 2010, pp. 32-38.

* cited by examiner

*Primary Examiner* — Sarah A. Slifka
(74) *Attorney, Agent, or Firm* — Porzio Bromberg & Newman

(57) ABSTRACT

Provided are a cathode active material for a lithium secondary battery which is represented by general formula (1) below and has a nanorod shape, a manufacturing method thereof, and a lithium secondary battery including the same.

$$LiNi_{1-x-y}Mn_xM_yO_2 \quad (1)$$

7 Claims, 3 Drawing Sheets

NANOROD-SHAPED CATHODE ACTIVE MATERIAL FOR LITHIUM SECONDARY BATTERY, MANUFACTURING METHOD THEREOF, AND LITHIUM SECONDARY BATTERY INCLUDING THE SAME

CROSS-REFERENCE TO RELATED APPLICATIONS

This application claims the benefit under 35 U.S.C. 119(a) of Korean Patent Application No. 10-2017-0147929 filed on Nov. 8, 2017 in the Korean Intellectual Property Office, the entire disclosure of which is incorporated herein by reference for all purposes.

BACKGROUND

Field

The present disclosure relates to a nanorod-shaped cathode active material for lithium secondary battery and more particularly, to a cathode active material for lithium secondary battery which has structural stability by controlling the metal composition and particle shape of the cathode active material for lithium secondary battery, a manufacturing method thereof, and a lithium secondary battery including the same.

Description of the Related Art

Technological development and increased demand for mobile devices have led to an increase in the demand for secondary batteries as an energy source. Particularly, lithium secondary batteries having high energy density, high voltage, excellent cycle characteristics and low self-discharge rate have been commercialized and are being widely used.

Lithium secondary batteries in related arts mainly employ a lithium cobalt composite oxide ($LiCoO_2$) as a main component of a cathode active material. The lithium cobalt composite oxide has low stability and is very expensive, and, thus, it has been difficult to mass-produce lithium secondary batteries. Accordingly, the use of a lithium manganese composite oxide, a lithium nickel composite oxide, etc. as an alternative material to the lithium cobalt composite oxide has been considered.

Particularly, the lithium nickel composite oxide is cheaper than the lithium cobalt composite oxide and has a reversible capacity close to 200 mAh/g when charged to 4.25 V. Therefore, it is easier to implement large-capacity batteries with the lithium nickel composite oxide than with the lithium cobalt composite oxide having a reversible capacity of 137 mAh/g.

However, $LiNiO_2$ has not been commercialized as a cathode active material in spite of its higher capacity than $LiCoO_2$ because some Ni ions located in a lithium-ion layer of nonstoichiometric $Li_{1-y}Ni_{1+y}O_2$ obstruct the diffusion of lithium ions, which causes a decrease in capacity, and when the amount of lithium is decreased by charge, the oxide is decomposed due to structural instability, and, thus, an oxygen partial pressure is increased and the risk of a battery explosion is increased due to chemical reaction with an organic electrolyte.

Accordingly, many conventional technologies have suggested lithium nickel composite oxides represented by $LiNi_{1-x}Co_xO_2$ or $LiNi_{1-x-y}M_xM'_yO_2$ by substituting a part of nickel with other transition metals such as Co, Mn, etc. to improve structural characteristics of $LiNiO_2$-based cathode active materials. If other $M^{3+}$ ions with a stable oxidation number are added, it becomes difficult for $Ni^{2+}$ to substitute for lithium ions in order to maintain charge neutrality, and, thus, a crystal structure becomes stabilized.

Article "Trends of development of cathode active material for a lithium secondary battery" in Ceramist Vol. 13, No. 5, October 2010, pp. 32-38 discloses a lithium transition metal oxide, in which a part of nickel is substituted with other transition metals such as manganese, cobalt, etc., as an alternative material.

However, in the above-described prior art document, a metal-substituted lithium nickel oxide is relatively excellent in cycle characteristics and capacity characteristics, but the cycle characteristics are sharply degraded in case of long-term use and swelling caused by gas generated from a battery and a decrease in thermal safety/stability caused by low chemical stability, which cannot be solved sufficiently.

SUMMARY

An object to be achieved by the present disclosure is to provide a cathode active material for a lithium secondary battery with improved structural stability.

Another object to be achieved by the present disclosure is to provide a manufacturing method of a cathode active material for a lithium secondary battery which has high structural stability by controlling the metal composition and particle shape of a lithium nickel oxide doped with manganese, magnesium, and mixed metals thereof.

Yet another object to be achieved by the present disclosure is to provide a lithium secondary battery with improved capacity and lifespan.

According to an aspect of the present disclosure, there is provided a cathode active material for a lithium secondary battery which is represented by general formula (1) below and has a nanorod shape.

$$LiNi_{1-x-y}Mn_xM_yO_2 \qquad (1)$$

In general formula (1), M is at least one metal selected from the group consisting of Co, Mg, Al, and Cr, 0.5<x<0.9, and 0≤y≤0.1.

Preferably, an aspect ratio of the nanorod is in the range of from 5 to 15.

According to another aspect of the present disclosure, there is provided a manufacturing method of a nanorod-shaped cathode active material for a lithium secondary battery, including: preparing a first metal-mixed solution by mixing a nickel metal oxide, a metal oxide, and a solvent; forming first nanoparticles of the first metal-mixed solution; preparing a second metal-mixed solution by mixing the first nanoparticles formed as described above, a lithium metal oxide, and a solvent; and forming second nanoparticles by performing a heat treatment to the second metal-mixed solution, and the forming of the first nanoparticles may be performed by a hydrothermal synthesis.

Preferably, the heat treatment is performed in the range of from 400° C. to 800° C.

The manufacturing method may further include adding a pH adjuster to the first metal-mixed solution.

The pH adjuster may include an aqueous solution selected from the group consisting of a citric acid aqueous solution, an acrylic acid aqueous solution, an ammonia aqueous solution, and a sodium hydroxide aqueous solution.

According to yet another aspect of the present disclosure, there is provided a lithium secondary battery including a nanorod-shaped cathode active material for lithium secondary battery, including: the cathode active material; an anode active material; and an electrolyte.

According to the present disclosure, a nanorod-shaped cathode active material for lithium secondary battery has a relatively high surface-to-volume ratio and thus can suppress deformation caused by structural deformation of the cathode active material caused during charges and discharges and maximize the lifespan stability.

A nanorod-shaped cathode active material for lithium secondary battery manufactured by a manufacturing method of a cathode active material for lithium secondary battery according to the present disclosure has a larger contact area with an electrolyte as compared to a nanoparticle or a bulk-type material since the composition and shape of a lithium nickel oxide are controlled by doping a metal such as manganese, magnesium, etc. Therefore, lithium ions have a short migration distance, and, thus, a high charge and discharge capacity can be obtained.

A lithium secondary battery according to the present disclosure has a large surface area and a high crystallinity, and, thus, the stability can be improved and the capacity retention depending on the speed and number of charges and discharges can be improved.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE PREFERRED EMBODIMENT

Figure 1A:
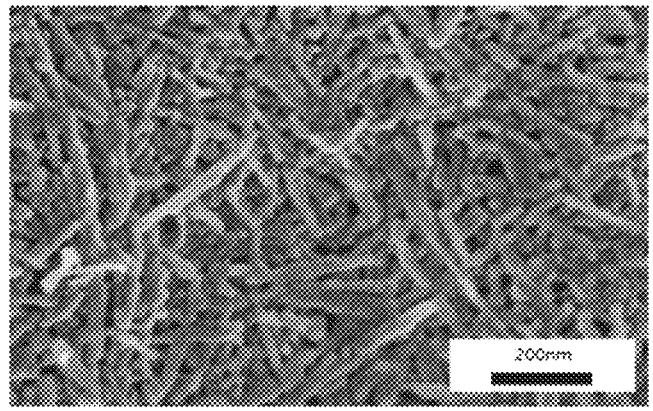
FIG. 1(a) is an SEM image of a nanorod-shaped cathode active material for a lithium secondary battery manufactured according to Example 1.

Hereinafter, the present disclosure will be described in more detail with reference to examples and the accompanying drawings.

A cathode active material for a lithium secondary battery according to the present disclosure is represented by general formula 1 below and has a nanorod shape.

$$\text{LiNi}_{1-x-y}\text{Mn}_x\text{M}_y\text{O}_2 \tag{1}$$

In general formula 1, M is at least one metal selected from the group consisting of Co, Mg, Al, and Cr, $0.5 < x < 0.9$, and $0 \le y \le 0.1$.

The nanorod-shaped cathode active material for a lithium secondary battery has a larger contact area with an electrolyte as compared to an existing spherical nanoparticle or bulk-type particle. Thus, lithium ions have a short diffusion distance and a high diffusion rate. Therefore, the nanorod-shaped cathode active material for a lithium secondary battery has a large charge and discharge capacity and exhibits excellent high-speed charge and discharge characteristics.

Further, the nanorod-shaped cathode active material for a lithium secondary battery has a relatively high surface area-to-volume ratio and thus can suppress structural deformation of the cathode active material caused by consecutive charges and discharges. Therefore, even if the number of charge and discharge cycles is increased, the nanorod-shaped cathode active material for a lithium secondary battery has a high capacity stability.

In general formula 1, an increase in the amount of metal which does not react with lithium may cause a decrease in capacity of the cathode active material. Further, if the ion radius of a metal is similar to the radius of a lithium ion, different metal may be located at the site of lithium and thus may obstruct the diffusion of lithium.

Preferably, an aspect ratio of the nanorod is in the range of from 5 to 15.

If the aspect ratio of the nanorod is less than 5, a contact resistance between electrode active materials may be increased and the electrical conductivity may be decreased, which is not suitable to suppress structural deformation of the cathode active material caused during charges and discharges. If the aspect ratio of the nanorod is more than 15, the diffusion distance of lithium ions is increased, and, thus, capacity characteristics and high-speed charge and discharge characteristics may be degraded.

Further, preferably, the nanorod may have an average thickness in the range of from 15 nm to 30 nm and an average length in the range of from 120 nm to 300 nm.

A manufacturing method of a nanorod-shaped cathode active material for a lithium secondary battery according to an example of the present disclosure includes: preparing a first metal-mixed solution by mixing a nickel metal oxide, a metal oxide, and a solvent; forming first nanoparticles of the first metal-mixed solution; preparing a second metal-mixed solution by mixing the first nanoparticles formed as described above, a lithium metal oxide, and a solvent; and forming second nanoparticles by performing a heat treatment to the second metal-mixed solution, and the forming of the first nanoparticles may be performed by a hydrothermal synthesis.

The heat treatment is performed preferably in the range of from 400° C. to 800° C. and more preferably at 550° C.

If the heat treatment is performed at more than 800° C., the nanorod may be transformed into a nanoparticle due to flocculation caused by an excessive heat energy. If the heat treatment is performed at less than 400° C., a nanorod-shaped cathode active material having a low crystallinity may be produced.

Further, preferably, the heat treatment may be performed under oxygen atmosphere for 1 to 12 hours. During the heat treatment, the diffusion reaction between metal particles in the metal-mixed solution can be carried out sufficiently and particularly, the reduction of $Ni^{3+}$ to $Ni^{2-}$ by carbon dioxide in the air can be suppressed.

The manufacturing method may further include adding a pH adjuster to the first metal-mixed solution.

The pH adjuster functions as a precipitant and can maintain a pH suitable for one-dimensional co-precipitation in the first metal-mixed solution.

Further, the pH adjuster may adjust reaction molar amounts of the co-precipitated elements in the first metal-mixed solution to make a change in particle shape and particle diameter of each of nanoplate, nanowire, nanobelt, etc.

The pH adjuster may include at least one aqueous solution selected from the group consisting of a citric acid aqueous solution, an acrylic acid aqueous solution, an ammonia aqueous solution, and a sodium hydroxide aqueous solution and may use preferably sodium hydroxide, but is not limited thereto.

A lithium secondary battery according to the present disclosure may include the cathode active material, an anode active material, and an electrolyte.

Specifically, the lithium secondary battery may include a cathode composed of a cathode active material and a current collector, an anode composed of an anode active material and a current collector, and an electrolyte for conduction of lithium ions between the cathode and the anode.

The anode active material may include one or more members selected from the group consisting of carbonaceous materials such as synthetic graphite, natural graphite, graphitized carbon fibers, amorphous carbon, etc., metallic compounds which can be alloyed with lithium such as silicon (Si), aluminum (Al), tin (Sn), lead (Pb), zinc (Zn), bismuth (Bi), indium (In), manganese (Mn), gallium (Ga), cadmium (Cd), silicon alloys, tin alloys, or aluminum alloys, and composites including the metallic compounds and the carbonaceous materials, but is not limited thereto.

The electrolyte may include one or more members selected from the group consisting of organic liquid electrolytes, inorganic liquid electrolytes, solid-type polymer electrolytes, gel-type polymer electrolytes, inorganic solid electrolytes, and molten-type inorganic electrolytes, but is not limited thereto.

The electrolyte may include an organic solvent and a lithium salt.

The organic solvent may include one or more organic solvents selected from the group consisting of N-methyl-2-pyrrolidinone, propylene carbonate, ethylene carbonate, butylene carbonate, dimethyl carbonate, diethyl carbonate, γ-butyrolactone, 1,2-dimethoxyethane, tetrahydroxy Franc, 2-methyltetrahydrofuran, dimethyl sulfoxide, 1,3-dioxolane, formamide, dimethylformamide, dioxolane, acetonitrile, nitromethane, methyl formate, methyl acetate, phosphoric acid triesters, trimethoxymethane, dioxolane derivatives, sulfolane, methylsulfolane, 1,3-dimethyl-2-imidazolidinone, propylene carbonate derivatives, tetrahydrofuran derivatives, ethers, methyl propionate, and ethyl propionate, but is not limited thereto.

The lithium salt may include one or more members selected from the group consisting of lithium hexafluorophosphate ($LiPF_6$), lithium tetrafluoroborate ($LiBF_4$), lithium hexafluoroantimonate ($LiSbF_6$), lithium hexafluoroarsenate ($LiAsF_6$), lithium difluoromethanesulfonate ($LiC_4F_9SO_3$), lithium perchlorate ($LiClO_4$), lithium aluminate ($LiAlO_2$), lithium tetrachloroaluminate ($LiAlCl_4$), lithium chloride (LiCl), lithium iodide (LiI), lithium bis(oxalato)borate ($LiB(C_2O_4)_2$), and lithium trifluoromethanesulfonyl imide, but is not limited thereto.

EXAMPLE

Example 1

$NiSO_4 \cdot 6H_2O$ (Aldrich, 2.06 g), $MnSO_4 \cdot H_2O$ (Aldrich, 0.12 g), and $MgSO_4$ (Aldrich, 0.12 g) were dissolved in 40 ml of distilled water and NaOH (Aldrich, 0.02 g) was added to the mixture, which was then reacted at 120° C. for 24 hours by a hydrothermal synthesis to form nanoparticles. Then, $LiOH \cdot H_2O$ was mixed therein and heat-treated at 550° C. for 12 hours under an oxygen atmosphere to manufacture a nanorod-shaped cathode active material for a lithium secondary battery.

It can be seen that the cathode active material for a lithium secondary battery has a nanorod shape having an aspect ratio of about 6 as illustrated in FIG. 1A.

Comparative Example 1

A cathode active material was manufactured in the same manner as described in Example 1 except $MgSO_4$ (Aldrich, 0.12 g).

Figure 1B:
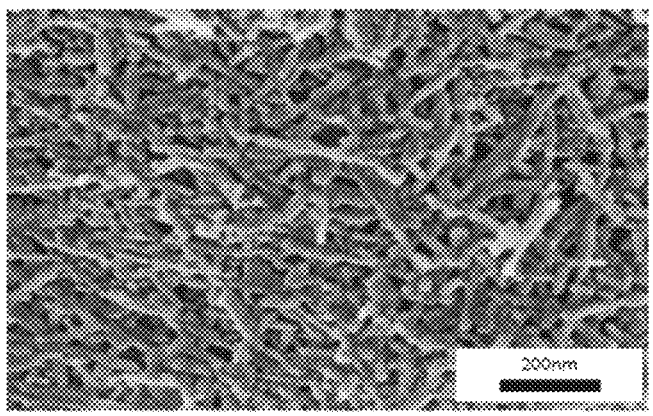
FIG. 1(b) is an SEM image of a nanorod-shaped cathode active material for a lithium secondary battery manufactured according to Comparative Example 1.

It can be seen that the cathode active material for a lithium secondary battery has a nanorod shape having an aspect ratio of about 4 as illustrated in FIG. 1B.

Comparative Example 2

An active material was manufactured in the same manner as described in Example 1 except $MnSO_4 \cdot H_2O$ (Aldrich, 0.12 g) and $MgSO_4$ (Aldrich, 0.12 g).

Figure 1C:
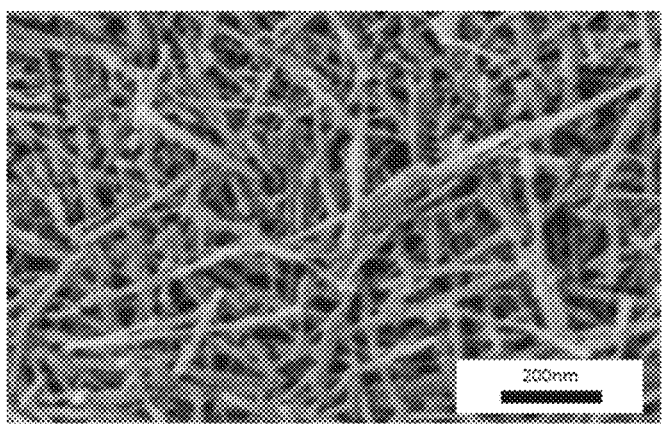
FIG. 1(c) is an SEM image of a nanorod-shaped cathode active material for a lithium secondary battery manufactured according to Comparative Example 2.

It can be seen that the cathode active material for a lithium secondary battery has a nanorod shape having an aspect ratio of about 17 as illustrated in FIG. 1C.

[Fabrication of Coin Cell]

Batteries were fabricated by the following method in order to evaluate electrochemical characteristics of secondary batteries including the cathode active materials prepared in Example 1 and Comparative Examples 1 and 2, respectively.

A 70 wt % cathode active material, 20 wt % conductive carbon black, and a 10 wt % polyvinylidene fluoride binder were mixed with NMP (N-methyl-2-pyrrolidine) to prepare slurry. The slurry was applied to aluminum foil and then dried and rolled to prepare a cathode.

The cathode, lithium metal, and a separator were used to fabricate a coin cell.

Herein, a solution including 1.0 M $LiPF_6$ dissolved in a 1:1-mixed solution of ethylene carbonate (EC) and diethyl carbonate (DEC) was used as an electrolyte.

[Evaluation Result]

1. Measurement of X-Ray Diffraction (XRD)

In order to find out structural characteristics of the cathode active material for a lithium secondary battery of the present disclosure, X-ray diffraction before and after a heat treatment was observed and illustrated in FIG. 2.

Figure 2A:
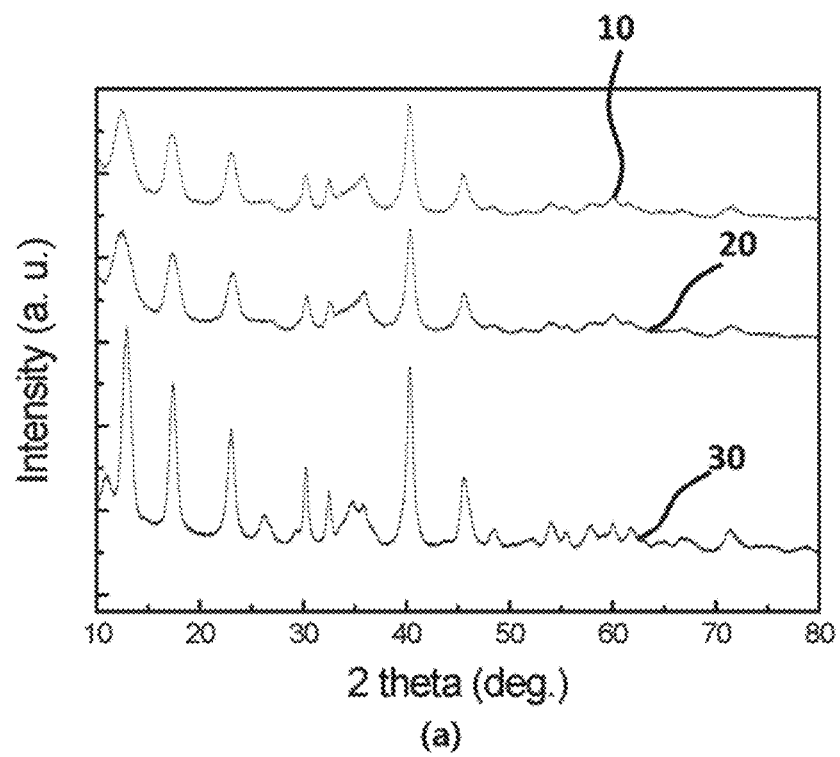
FIG. 2(a) is an X-ray diffraction graph before a heat treatment.
Figure 2B:
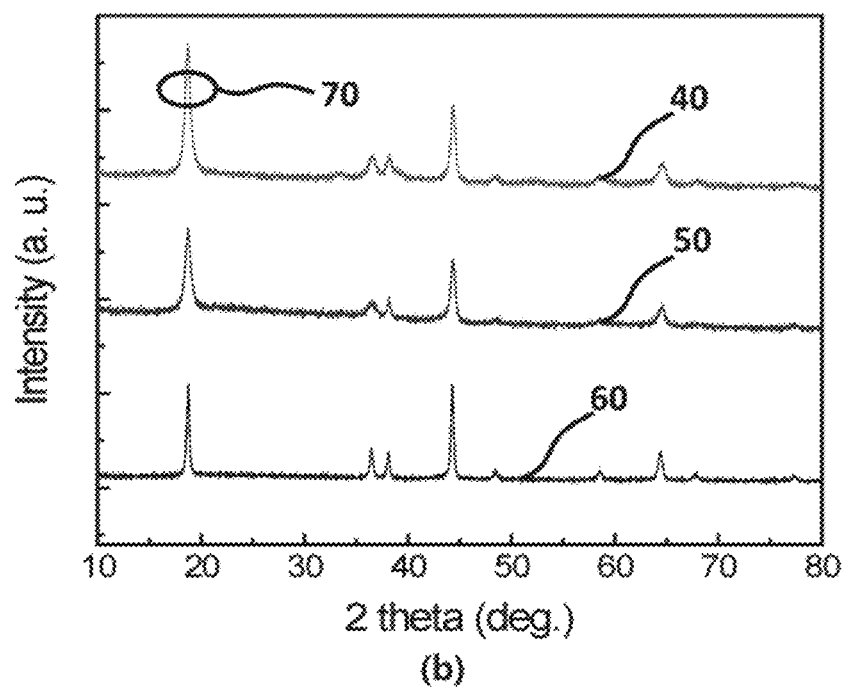
FIG. 2(b) is an X-ray diffraction graph after a heat treatment.

In FIG. 2A, a diffraction pattern 10, a diffraction pattern 20, and a diffraction pattern 30 represent X-ray diffraction graphs for a Mn and Mg-doped nickel hydroxide, a Mn-doped nickel hydroxide, and a nickel hydroxide nanowire precursor, respectively. A diffraction pattern 40 in FIG. 2B represents an X-ray diffraction graph for a Mn and Mg-doped lithium nickel oxide cathode active material prepared according to Example 1, a diffraction pattern 50 in FIG. 2B represents an X-ray diffraction graph for a Mn-doped lithium nickel oxide cathode active material prepared according to Comparative Example 1, and a diffraction pattern 60 in FIG. 2B represents an X-ray diffraction graph for a lithium nickel oxide cathode active material prepared according to Comparative Example 2.

The diffraction pattern 10, the diffraction pattern 20, and the diffraction pattern 30 for precursor nanowire in FIG. 2A show that the diffraction lines move to lower angles depending on doping, which means that the lattice constants increase with doping. The diffraction pattern 40, the diffraction pattern 50, and the diffraction pattern 60 after a high-temperature solid-state reaction in FIG. 2B show the absence of other impurities and excellent crystallinity. Particularly, it can be seen that a diffraction line 70 of the diffraction pattern 40 for the Mn and Mg-doped lithium nickel oxide has the most significant phase and the crystallinity increases.

2. Characteristics of Battery

In order to evaluate a capacity of a battery including the cathode active material for a lithium secondary battery of the present disclosure, the charge and discharge characteristics of a battery manufactured according to the manufacturing method of a coin cell were illustrated in FIG. 3.

Figure 3A:
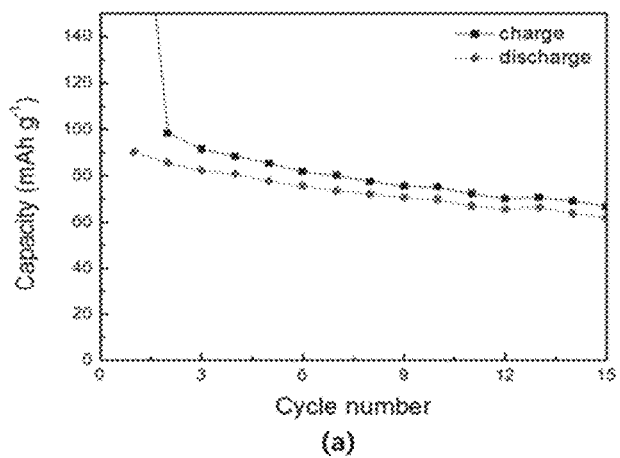
FIG. 3(a) provides graphs showing a capacity depending on the charge or discharge of a battery.

A battery including the cathode active material prepared in Example 1 as illustrated in FIG. 3A has an initial discharge capacity of 90.0 mAh/g and a discharge capacity equivalent to 69% or more of the initial discharge capacity after 15 charge and discharge cycles.

Figure 3B:
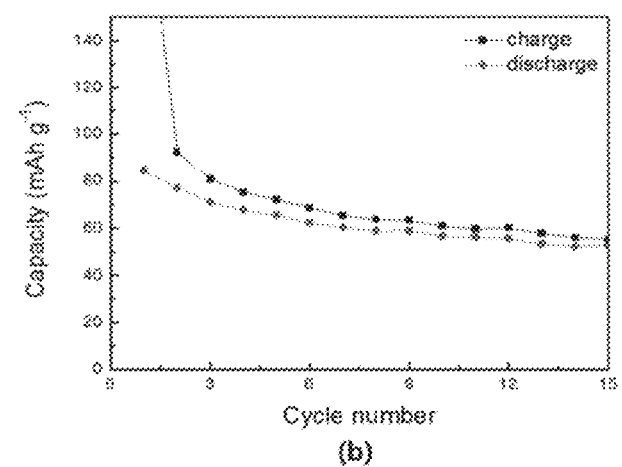
FIG. 3(b) provides graphs showing a capacity depending on the charge or discharge of a battery.

A battery including the cathode active material prepared in Comparative Example 1 as illustrated in FIG. 3B has an initial discharge capacity of 84.6 mAh/g and a discharge capacity equivalent to less than 62% of the initial discharge capacity after 15 charge and discharge cycles.

Figure 3C:
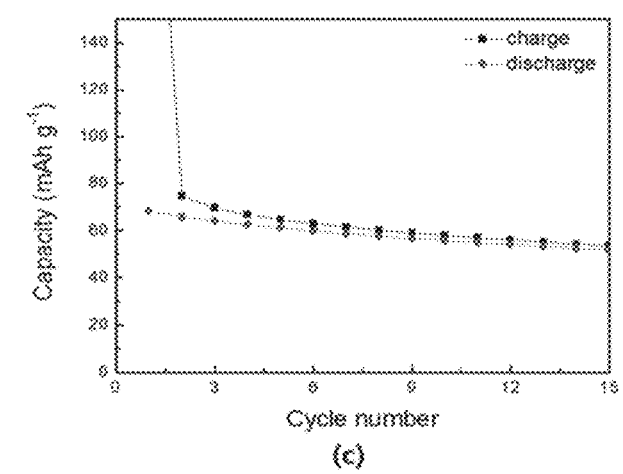
FIG. 3(c) provides graphs showing a capacity depending on the charge or discharge of a battery.

A battery including the cathode active material prepared in Comparative Example 2 as illustrated in FIG. 3C has an initial discharge capacity of 68.2 mAh/g and a discharge capacity equivalent to less than 75% of the initial discharge capacity after 15 charge and discharge cycles.

The Mn and Mg-doped lithium nickel oxide cathode active material shows a slight decrease in initial stability but also shows an increase in charge and discharge capacity. To sum up, the battery including the cathode active material prepared in Example 1 has the highest initial discharge capacity and a considerable discharge capacity retention and thus shows the highest discharge capacity even after 15 charge and discharge cycles.

What is claimed is:

1. A cathode active material for a lithium secondary battery which is represented by general formula (1) below and has a nanorod shape:

$$LiNi_{1-x-y}Mn_xM_yO_2 \qquad (1)$$

wherein in general formula (1), M is at least one metal selected from a group consisting of Mg, Al, and Cr, $0.5<x<0.9$, and $0<y\leq0.1$.

2. The cathode active material for a lithium secondary battery according to claim 1, wherein an aspect ratio of the nanorod is in range of from 5 to 15.

3. A manufacturing method of a cathode active material for a lithium secondary battery, the method comprising:
mixing a nickel metal oxide, a metal oxide, and a solvent to prepare a first metal-mixed solution;
forming first nanoparticles of the first metal-mixed solution;
mixing the first nanoparticles formed as described above, a lithium metal oxide, and a solvent to prepare a second metal-mixed solution; and
performing a heat treatment to the second metal-mixed solution to form second nanoparticles, wherein the forming of the first nanoparticles is performed by a hydrothermal synthesis wherein the cathode active material for a lithium secondary battery is represented by general formula (1) below and has a nanorod shape:

$$LiNi_{1-x-y}Mn_xM_yO_2 \qquad (1)$$

wherein in general formula (1), M is at least one metal selected from a group consisting of Mg, Al, and Cr, $0.5<x<0.9$, and $0<y\leq0$.

4. The manufacturing method of a cathode active material for a lithium secondary battery according to claim 3, wherein the heat treatment is performed in range of from 400° C. to 800° C.

5. The manufacturing method of a cathode active material for a lithium secondary battery according to claim 3, further comprising:
adding a pH adjuster to the first metal-mixed solution.

6. The manufacturing method of a cathode active material for a lithium secondary battery according to claim 5, wherein the pH adjuster includes at least one aqueous solution selected from a group consisting of a citric acid aqueous solution, an acrylic acid aqueous solution, an ammonia aqueous solution, and a sodium hydroxide aqueous solution.

7. A lithium secondary battery comprising:
the cathode active material of claim 1;
an anode active material; and
an electrolyte.

* * * * *